US011721228B2

(12) United States Patent
Lewis

(10) Patent No.: US 11,721,228 B2
(45) Date of Patent: Aug. 8, 2023

(54) METHOD AND SYSTEM FOR IMPLEMENTING AI-POWERED AUGMENTED REALITY LEARNING DEVICES

(71) Applicant: CenturyLink Intellectual Property LLC, Broomfield, CO (US)

(72) Inventor: Ronald A. Lewis, Bastrop, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 1242 days.

(21) Appl. No.: 16/248,481

(22) Filed: Jan. 15, 2019

(65) Prior Publication Data

US 2019/0266906 A1 Aug. 29, 2019

Related U.S. Application Data

(60) Provisional application No. 62/636,255, filed on Feb. 28, 2018.

(51) Int. Cl.
*G09B 5/00* (2006.01)
*G06F 3/147* (2006.01)
(Continued)

(52) U.S. Cl.
CPC .............. *G09B 5/06* (2013.01); *G06F 3/147* (2013.01); *G06N 20/00* (2019.01); *G06T 7/74* (2017.01); *G06V 10/235* (2022.01); *G06V 40/18* (2022.01); *G06V 40/19* (2022.01); *G09B 5/00* (2013.01); *G09B 19/00* (2013.01);
(Continued)

(58) Field of Classification Search
CPC ... G09B 5/00; G09B 5/02; G09B 5/04; G09B 5/06; G09B 5/065
See application file for complete search history.

(56) References Cited

U.S. PATENT DOCUMENTS 7,013,325 B1 * 3/2006 Vivian ..................... G09B 5/00
434/323
2005/0250079 A1 * 11/2005 Knepper .................. G09B 1/00
434/159
(Continued)

FOREIGN PATENT DOCUMENTS

WO WO-2017152215 A1 * 9/2017

*Primary Examiner* — Robert J Utama
*Assistant Examiner* — Correll T French

(57) ABSTRACT

Novel tools and techniques are provided for implementing learning technologies, and, more particularly, to methods, systems, and apparatuses for implementing artificial intelligence ("AI")-powered augmented reality learning devices. In various embodiments, a computing system might receive captured images of positions of a user's eyes correlated with particular portions of first content being displayed on a display device; might identify a first object(s) of a plurality of objects being displayed on the display device that correspond to the positions of the user's eyes as the first content is being displayed, based on analysis of the received captured images of the positions of the user's eyes; might send, to a content source, a request for additional content containing the identified first object(s); and based on a determination that second content containing the identified first object(s) is available, might retrieve and display the second content on the display surface of the display device.

18 Claims, 9 Drawing Sheets

(51) Int. Cl.
  *G09B 5/06* (2006.01)
  *G06V 40/19* (2022.01)
  *G06T 7/73* (2017.01)
  *G06N 20/00* (2019.01)
  *G09B 19/00* (2006.01)
  *G06V 10/22* (2022.01)
  *G06V 40/18* (2022.01)
  G09B 5/02 (2006.01)
  G09B 5/04 (2006.01)

(52) U.S. Cl.
  CPC ...... *G06T 2207/30201* (2013.01); *G09B 5/02* (2013.01); *G09B 5/04* (2013.01); *G09B 5/065* (2013.01)

(56) References Cited

U.S. PATENT DOCUMENTS

| | | | | |
|---|---|---|---|---|
| 2010/0003659 | A1* | 1/2010 | Edmonds | G09B 7/04 434/350 |
| 2010/0070872 | A1* | 3/2010 | Trujillo | G06F 3/04892 715/745 |
| 2010/0159437 | A1* | 6/2010 | German | G09B 7/02 707/E17.046 |
| 2013/0016044 | A1* | 1/2013 | Nguyen | G09B 7/02 345/173 |
| 2017/0295229 | A1* | 10/2017 | Shams | G06F 3/017 |
| 2017/0329401 | A1* | 11/2017 | Mitchell | G06F 3/013 |
| 2018/0114453 | A1* | 4/2018 | Jain | G09B 5/14 |
| 2018/0277002 | A1* | 9/2018 | Hergenroeder | B25J 11/005 |
| 2019/0371189 | A1* | 12/2019 | Hiraide | G06V 40/172 |

* cited by examiner

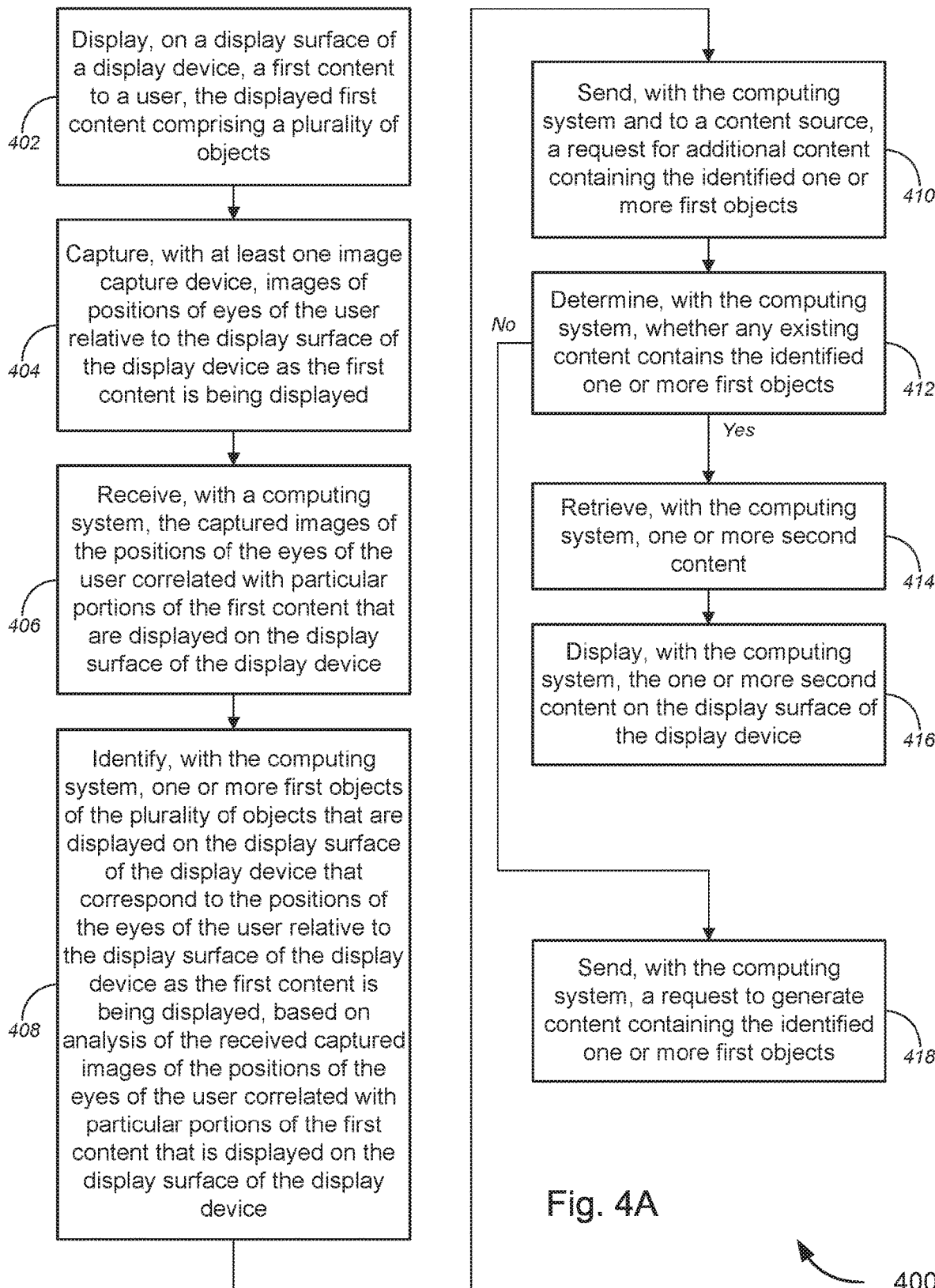

METHOD AND SYSTEM FOR IMPLEMENTING AI-POWERED AUGMENTED REALITY LEARNING DEVICES

CROSS-REFERENCES TO RELATED APPLICATIONS

This application claims priority to U.S. Patent Application Ser. No. 62/636,255 (the "'255 Application"), filed Feb. 28, 2018 by Ronald A. Lewis, entitled, "Method and System for Implementing AI-Powered Augmented Reality Learning Devices," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing learning technologies, and, more particularly, to methods, systems, and apparatuses for implementing artificial intelligence ("AI")-powered augmented reality learning devices.

BACKGROUND

Today, the education process is largely a mix of teacher-led instruction and practical application (including paper exercises and tests, etc.). There is a single standard, grade-based curriculum that does not necessarily account for strengths and weaknesses of each student, nor does it adequately gauge the depth of material absorption.

To compound this issue, holding a student's attention during the education or learning process is becoming increasingly challenging. Studies have shown that due to the bombardment of visual stimulus (e.g., social media, tablets, mobile devices, computers, television, etc.), the human brain is changing and attention spans are decreasing. In order to increase the efficiency of the learning process, there must be tools and methods for identifying and gauging a student's interest in the subject matter, for customizing learning experiences based on students' interests, and for developing and evolving a curriculum that uses both strengths and interests to map to an educational ontology that provides preparation for both higher learning and job skill.

Current education or learning process technologies, however, do not appear to either adequately gauge the depth of material absorption by students nor customize learning experiences for each student based on the student's interests, nor develop and evolve a curriculum that uses both strengths and interests of the student to map to an educational ontology that prepares the student for both higher education and job skill.

Hence, there is a need for more robust and scalable solutions for implementing learning technologies, and, more particularly, to methods, systems, and apparatuses for implementing artificial intelligence ("AI")-powered augmented reality learning devices.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4D are flow diagrams illustrating a method for implementing AI-powered augmented reality learning devices, in accordance with various embodiments.

DETAILED DESCRIPTION OF CERTAIN EMBODIMENTS

Overview

Figure 1:
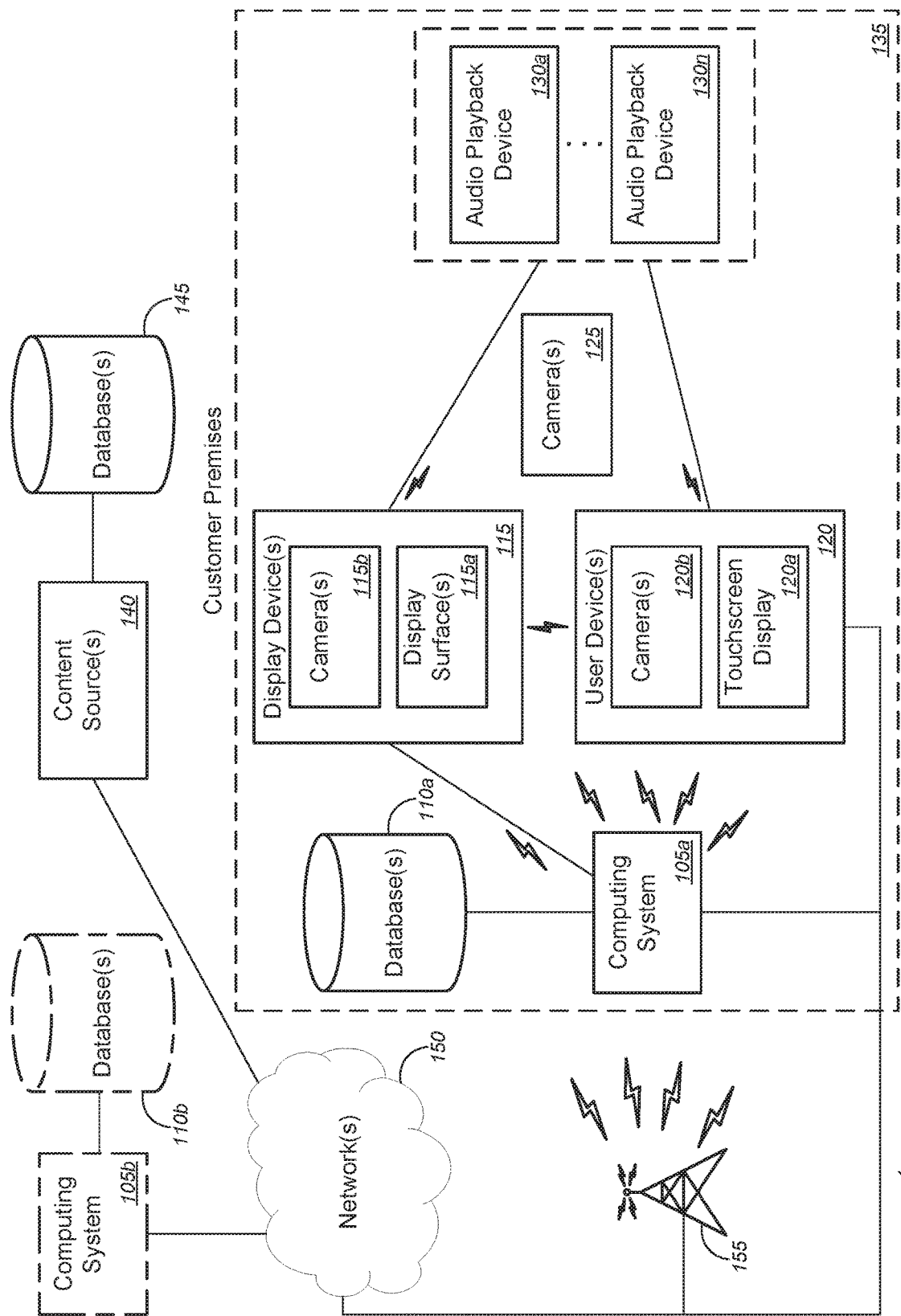
FIG. 1 is a schematic diagram illustrating a system for implementing artificial intelligence ("AI")-powered augmented reality learning devices, in accordance with various embodiments.

Various embodiments provide tools and techniques for implementing learning technologies, and, more particularly, to methods, systems, and apparatuses for implementing artificial intelligence ("AI")-powered augmented reality learning devices.

In various embodiments, a display device(s) and/or a user device(s) might display, on a display surface thereof (e.g., display screen, lenses of virtual reality or augmented reality goggles or headsets, lenses of smart eyewear, etc.), a first content to a user, the displayed first content comprising a plurality of objects. A camera(s) or image capture device(s) might capture images of positions (or focus directions or movements) of the eyes of the user relative to the display surface(s) of the display device(s) and/or the user device(s) as the first content is being displayed. A computing system might receive the captured images of the positions (or focus directions or movements) of the eyes of the user correlated with particular portions of the first content that are displayed on the display surface(s) of the display device(s) or the user device(s). The computing system might identify one or more first objects of the plurality of objects that are displayed on the display surface(s) that correspond to the positions of the eyes of the user relative to the display surface(s) as the first content is being displayed, based at least in part on analysis of the received captured images of the positions of the eyes of the user correlated with particular portions of the first content that is displayed on the display surface(s). The computing system might send a request to a content source(s) for additional content containing the identified one or more first objects. Based on a determination that one or more second content containing the identified one or more first objects are available via the content source(s) and/or corresponding database(s), the computing system might retrieve the one or more second content from the database(s) via the content source(s), and might display the one or more second content on the display surface(s). Based on a determination that no content containing the identified one or more first objects is available via the content source(s) and/or corresponding database(s), the computing system might send a request to the content generator(s) to generate content containing the identified one or more first objects, might retrieve the generated content from the database(s) via the content generator(s), and might display the generated content on the display surface(s).

In some cases, each of the first content and the one or more second content might include, without limitation, at least one of video content, image content, text content, or scenery content, and/or the like. In some instances, each of the first content and the one or more second content might comprise teaching material associated with subjects including, but is not limited to, at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like. In some embodiments, the plurality of objects might include, without limitation, at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books, and/or the like.

The various embodiments rely on the eye to brain signal pathways to identify student interests. Human behavior dictates that our eyes naturally follow the objects that capture our interest. For example, grocery stores put candy on the bottom two feet of the aisles adjacent to the checkout counter because children's eyes are drawn directly to it. By identifying the topics that capture a student's interest, the learning process can be greatly enhanced, and coupling it with augmented reality, for instance, one can provide a greatly enriched learning experience for the student. With the various embodiments as described herein, it is possible to develop a higher degree of competency at a greater learning rate, to reduce the overall cost of education, all while better preparing students for positions in the job market.

These and other functions of the various embodiments are described in greater detail below with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, teaching technology, student learning technology, user interest monitoring technology, and/or the like. In other aspects, certain embodiments, can improve the functioning of user equipment or systems themselves (e.g., teaching systems, student learning systems, user interest tracking or monitoring systems, etc.), for example, by receiving, with a computing system, the captured images of the positions of the eyes of the user correlated with particular portions of the first content that are displayed on the display surface of the display device; identifying, with the computing system, one or more first objects of the plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device; sending, with the computing system and to a content source, a request for additional content containing the identified one or more first objects; based on a determination that one or more second content containing the identified one or more first objects are available via the content source, retrieving, with the computing system, the one or more second content and displaying, with the computing system, the one or more second content on the display surface of the display device; and based on a determination that no content containing the identified one or more first objects is available via the content source, sending, with the computing system, a request to generate content containing the identified one or more first objects; and/or the like. In particular, to the extent any abstract concepts are present in the various embodiments, those concepts can be implemented as described herein by devices, software, systems, and methods that involve specific novel functionality (e.g., steps or operations), such as, tracking or monitoring the position(s) of either the pupils or the irises of the eyes of the user so as to determine in what direction(s) the eyes are focused on, in order to correlate with the spot(s) or portion(s) of the display surface on which the user is specifically looking, and in order to determine at the time the user is focusing on that(those) particular spot(s) or portion(s) of the display surface what objects are being displayed to the user, and tailoring content to be presented to the user based on identification of what interests the user, and/or the like, which optimizes the learning process for the user in a manner that improves learning material absorption by the user while providing the system with a better understanding of what interests the user in order to aid the user in preparing for higher education and for future careers, and/or the like, to name a few examples, that extend beyond mere conventional computer processing operations. These functionalities can produce tangible results outside of the implementing computer system, including, merely by way of example, optimized learning process for the user in a manner that improves learning material absorption by the user while providing the system with a better understanding of what interests the user in order to aid the user in preparing for higher education and for future careers, and/or the like, at least some of which may be observed or measured by users and/or service providers.

In an aspect, a method might comprise displaying, on a display surface of a display device, a first content to a user, the displayed first content comprising a plurality of objects, and capturing, with at least one image capture device, images of positions of eyes of the user relative to the display surface of the display device as the first content is being displayed. The method might also comprise receiving, with a computing system, the captured images of the positions of the eyes of the user correlated with particular portions of the first content that are displayed on the display surface of the display device; identifying, with the computing system, one or more first objects of the plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device; and sending, with the computing system and to a content source, a request for additional content containing the identified one or more first objects. The method might further comprise, based on a determination that one or more second content containing the identified one or more first objects are available via the content source, retrieving, with the computing system, the one or more second content and displaying, with the computing system, the one or more second content on the display surface of the display device.

In some embodiments, each of the first content and the one or more second content might comprise at least one of video content, image content, text content, or scenery content, and/or the like. In some cases, each of the first content and the one or more second content comprises teaching material associated with subjects comprising at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like. In some instances, the plurality of objects might comprise at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books, and/or the like.

According to some embodiments, the display device might comprise one of augmented reality ("AR") goggles, virtual reality ("VR") goggles, smart eyewear, a tablet computer, a smart phone, a television, or a monitor, and/or the like. In some embodiments, the at least one image capture device might be disposed in one of augmented reality ("AR") goggles facing eyes of a wearer, virtual reality ("VR") goggles facing eyes of a wearer, a wearer-facing surface of smart eyewear, a user-facing panel of a tablet computer, a user-facing panel of a smart phone, an external component mounted on a television to face a room, or a user-facing panel of a monitor, and/or the like. According to some embodiments, the computing system might comprise one of a set-top box ("STB"), a digital video recording ("DVR") device, a processor of the display device running a software application ("app"), a processor of a user device running an app, a server computer over a network, a cloud-based computing system over a network, a media player, or a gaming console, and/or the like.

In some embodiments, the method might further comprise, based on a determination that no content containing the identified one or more first objects is available via the content source, sending, with the computing system, a request to generate content containing the identified one or more first objects.

According to some embodiments, correlating the captured images of the positions of the eyes of the user with particular portions of the first content that are displayed on the display surface of the display device might comprise analyzing, with the computing system, reflections of the first content on surfaces of the eyes, and matching, with the computing system, the captured images of the positions of the eyes of the user with the analyzed reflections of the first content. Alternatively, or additionally, correlating the captured images of the positions of the eyes of the user with particular portions of the first content that are displayed on the display surface of the display device might comprise synchronizing, with at least one of the computing system, the at least one image capture device, or the display device, the display of the first content and the capture of the images of the positions of the eyes of the user relative to the display surface of the display device. In some cases, synchronizing the display of the first content and the capture of the images of the positions of the eyes of the user relative to the display surface of the display device might comprise one of synchronizing timestamps associated with the first content being displayed with timestamps associated with the images of the positions of the eyes of the user, or embedding timestamps associated with the first content being displayed in the captured images of the positions of the eyes of the user, and/or the like.

Merely by way of example, in some instances, identifying the one or more first objects might comprise at least one of identifying one or more first objects on which the eyes of the user focus or linger for at least a predetermined amount of time, identifying one or more first objects that the eyes of the user trace, identifying one or more first objects to which the eyes of the user sudden flick, or identifying one or more first objects to which the eyes of the user repeatedly returns, and/or the like.

In some embodiments, the method might further comprise receiving, with the computing system, captured images of positions of eyes of each of a plurality of users correlated with particular portions of content that are displayed on display surfaces of corresponding display devices; identifying, with the computing system, one or more second objects of the plurality of objects that are displayed on the display surface of the corresponding display devices that correspond to the positions of the eyes of each user of the plurality of users relative to the display surface of the corresponding display devices as the content are being displayed, based at least in part on analysis of the received captured images of the positions of the eyes of each of the plurality of users correlated with particular portions of the content that are displayed on the display surface of the corresponding display device; determining, with the computing system, whether there are common objects among the identified one or more second objects; based on a determination that there are common objects among the identified one or more second objects, identifying, with the computing system, one or more third objects among the one or more second objects that are common among each of one or more sets of users among the plurality of users; sending, with the computing system and to the content source, a request for additional content containing the identified one or more third objects; and based on a determination that one or more third content containing the identified one or more third objects are available via the content source, retrieving, with the computing system, the one or more third content and displaying, with the computing system, the one or more third content on the display surface of each of the corresponding display devices.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive captured images of positions of eyes of a user correlated with particular portions of first content that are displayed on display surface of a display device; identify one or more first objects of a plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device; send, to a content source, a request for additional content containing the identified one or more first objects; and based on a determination that one or more second content containing the identified one or more first objects are available via the content source, retrieve the one or more second content and display the one or more second content on the display surface of the display device.

According to some embodiments, each of the first content and the one or more second content might comprise at least one of video content, image content, text content, or scenery content, and/or the like. In some instances, each of the first content and the one or more second content might comprise teaching material associated with subjects comprising at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like. In some cases, the plurality of objects might comprise at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books, and/or the like.

In some embodiments, the display device might comprise one of augmented reality ("AR") goggles, virtual reality ("VR") goggles, smart eyewear, a tablet computer, a smart phone, a television, or a monitor, and/or the like. In some cases, the at least one image capture device might be disposed in one of augmented reality ("AR") goggles facing eyes of a wearer, virtual reality ("VR") goggles facing eyes of a wearer, a wearer-facing surface of smart eyewear, a user-facing panel of a tablet computer, a user-facing panel of a smart phone, an external component mounted on a television to face a room, or a user-facing panel of a monitor, and/or the like. In some instances, the apparatus might comprise one of a set-top box ("STB"), a digital video recording ("DVR") device, the display device, a user device, a server computer over a network, a cloud-based computing system over a network, a media player, or a gaming console, and/or the like.

In yet another aspect, a system might comprise a display device, at least one image capture device, and a computing system. The display device might comprise a display surface; at least one first processor; and a first non-transitory computer readable medium communicatively coupled to the at least one first processor. The first non-transitory computer readable medium might have stored thereon computer software comprising a first set of instructions that, when executed by the at least one first processor, causes the display device to: receive a first content; and display the first content to a user, the displayed first content comprising a plurality of objects. The at least one image capture device might capture images of positions of eyes of the user relative to the display surface of the display device as the first content is being displayed. The computing system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the computing system to: receive the captured images of the positions of the eyes of the user correlated with particular portions of the first content that are displayed on the display surface of the display device; identify one or more first objects of the plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device; send, to a content source, a request for additional content containing the identified one or more first objects; and based on a determination that one or more second content containing the identified one or more first objects are available via the content source, retrieve the one or more second content and display the one or more second content on the display surface of the display device.

In some embodiments, each of the first content and the one or more second content might comprise at least one of video content, image content, text content, or scenery content, and/or the like. In some instances, each of the first content and the one or more second content might comprise teaching material associated with subjects comprising at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like. In some cases, the plurality of objects might comprise at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books, and/or the like.

According to some embodiments, the display device might comprise one of augmented reality ("AR") goggles, virtual reality ("VR") goggles, smart eyewear, a tablet computer, a smart phone, a television, or a monitor, and/or the like. In some cases, the at least one image capture device might be disposed in one of augmented reality ("AR") goggles facing eyes of a wearer, virtual reality ("VR") goggles facing eyes of a wearer, a wearer-facing surface of smart eyewear, a user-facing panel of a tablet computer, a user-facing panel of a smart phone, an external component mounted on a television to face a room, or a user-facing panel of a monitor, and/or the like. In some instances, the computing system might comprise one of a set-top box ("STB"), a digital video recording ("DVR") device, a processor of the display device running a software application ("app"), a processor of a user device running an app, a server computer over a network, a cloud-based computing system over a network, a media player, or a gaming console, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing learning technologies, and, more particularly, to methods, systems, and apparatuses for implementing artificial intelligence ("AI")-powered augmented reality learning devices, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing artificial intelligence ("AI")-powered augmented reality learning devices, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100, according to some embodiments, might further comprise one or more display devices 115 (collectively, "display devices 115" or the like), which might each include a display surface(s) 115a and one or more image capture devices (or camera(s)) 115b, and one or more user devices 120 (collectively, "user devices 120" or the like), which might each include a touchscreen display or touchscreen display device 120a and one or more image capture devices (or camera(s)) 120b, and/or the like. In some instances, system 100 might further comprise one or more external image capture devices (or camera(s)) 125. In some embodiments, the display surface(s) 115a might each include one of a touchscreen display screen, a non-touch display screen, a liquid crystal display ("LCD")-based display screen, a light emitting diode ("LED")-based display screen, lenses of smart eyewear (on which images can be displayed), lenses of virtual reality goggles or eyewear, lenses augment reality goggles or eyewear, and/or the like. In some cases, system 100 might further, or optionally, comprise one or more audio playback devices 130a-130n (collectively, "audio playback devices 130" or "speakers 130" or the like), and/or the like. Each of the one or more display devices 115, the one or more user devices 120, and/or the one or more external image capture devices 125 might communicatively couple to the computing system 105a, and/or to each other, either via wireless connection and/or via wired connection.

According to some embodiments, the computing system 105a might include, without limitation, one of a set-top box ("STB"), a digital video recording ("DVR") device, a processor of the display device(s) 115 running a software application ("app"), a processor of a user device(s) 120 running an app, a server computer over a network, a cloud-based computing system over a network, a media player, or a gaming console, and/or the like. In some instances, the one or more display devices 115 might each include, but is not limited to, one of augmented reality ("AR") goggles or eyewear, virtual reality ("VR") goggles or eyewear, smart eyewear, a tablet computer, a smart phone, a television, or a monitor, and/or the like, with display surfaces 115a. In some cases, the one or more user devices 120 might each include, without limitation, one of AR goggles or eyewear, VR goggles or eyewear, smart eyewear, a laptop computer, a tablet computer, a smart phone, a mobile phone, a personal digital assistant, a remote control device, or a portable gaming device, and/or the like. In some embodiments, the image capture device(s) 115b, 120b, and 125 might each be disposed in one of AR goggles facing eyes of a wearer, VR goggles facing eyes of a wearer, a wearer-facing surface of smart eyewear, a user-facing panel of a tablet computer, a user-facing panel of a smart phone, an external component mounted on a television to face a room, or a user-facing panel of a monitor, and/or the like.

The one or more user devices 120 might each receive user input from a user (in various embodiments, receiving touch input from the user via the touchscreen display 120a), and might each relay the user input to the computing system 105a, according to some embodiments. In some cases, the computing system 105a, the database 110a, the one or more display devices 115 (including the display surface(s) 115a and/or the audio playback device(s) 130, etc.), and the user device(s) 120 may be disposed within a customer premises 135, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

System 100 might further comprise one or more content sources or servers 140 and corresponding databases 145 that might communicatively couple to the computing system 105a via one or more networks 150 (and in some cases, via one or more telecommunications relay systems 155, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 155 and the computing system 105*a*, between the one or more telecommunications relay systems 155 and each of at least one of the user devices 120, between the computing system 105*a* and each of at least one of the display devices 115, between the computing system 105*a* and each of at least one of the user devices 120, between the display device(s) 115 and the user device(s) 120, between the computing system 105*a* and each of the external image capture devices 125, between the computing system 105*a* and each of the one or more audio playback devices 130*a*-130*n*, between the display device(s) 115 and each of at least one of the one or more audio playback devices 130*a*-130*n*, between the user device(s) 120 and each of at least one of the one or more audio playback devices 130*a*-130*n*, and/or the like. According to some embodiments, alternative or additional to the computing system 105*a* and corresponding database 110*a* being disposed within customer premises 135, system 100 might comprise remote computing system 105*b* and corresponding database(s) 110*b* that communicatively couple with the one or more display devices 115 and/or with the one or more user devices 120 in the customer premises via the one or more networks 150 (and in some cases, via the one or more telecommunications relay systems 155). According to some embodiments, remote computing system 105*b* might include, without limitation, at least one of a server computer over a network, a cloud-based computing system over a network, and/or the like.

In operation, the display device(s) 115 and/or the user device(s) 120 might display, on a display surface thereof (e.g., display surface(s) 115*a* or touchscreen display 120*a*), a first content to a user, the displayed first content comprising a plurality of objects. The camera(s) 115*b*, 120*b*, and/or 125 might capture images of positions (or focus directions) of eyes of the user relative to the display surface(s) of the display device(s) 115 as the first content is being displayed. The computing system 105*a* or 105*b* (or user device(s) 120, or the like) might receive the captured images of the positions (or focus directions) of the eyes of the user correlated with particular portions of the first content that are displayed on the display surface(s) 115*a* or 120*a* of the display device(s) 115 (or user device(s) 120). In some cases, the captured images of the positions (or focus directions) of the eyes of the user correlated with particular portions of the first content that are displayed on the display surface(s) 115*a* or 120*a* of the display device(s) 115 (or user device(s) 120)) may be received from database(s) 110*a* or other databases as recorded images, or the like. The computing system 105*a* or 105*b* (or user device(s) 120, or the like) might identify one or more first objects of the plurality of objects that are displayed on the display surface(s) 115*a* or 120*a* of the display device(s) 115 (or user device(s) 120) that correspond to the positions of the eyes of the user relative to the display surface(s) 115*a* or 120*a* of the display device(s) 115 (or user device(s) 120) as the first content is being displayed, based at least in part on analysis of the received captured images of the positions of the eyes of the user correlated with particular portions of the first content that is displayed on the display surface(s) 115*a* or 120*a* of the display device(s) 115 (or user device(s) 120). The computing system 105*a* or 105*b* (or user device(s) 120, or the like) might send a request to a content source(s) 140 for additional content containing the identified one or more first objects. Based on a determination that one or more second content containing the identified one or more first objects are available via the content source(s) 140 and/or database(s) 145, the computing system 105*a* or 105*b* (or user device(s) 120, or the like) might retrieve the one or more second content from the database(s) 145 via the content source(s) 140, and might display the one or more second content on the display surface(s) 115*a* or 120*a* of the display device(s) 115 (or user device(s) 120). Based on a determination that no content containing the identified one or more first objects is available via the content source(s) 140 and/or database(s) 145, the computing system 105*a* or 105*b* (or user device(s) 120, or the like) might send a request to the content generator(s) to generate content containing the identified one or more first objects, might retrieve the generated content from the database(s) via the content generator(s), and might display the generated content on the display surface(s) 115*a* or 120*a* of the display device(s) 115 (or user device(s) 120). Herein, tracking or monitoring the position(s) of the eyes of the user refers to tracking or monitoring either the pupils or the irises of the eyes of the user so as to determine in what direction(s) the eyes are focused on, in order to correlate with the spot(s) or portion(s) of the display surface on which the user is specifically looking, and in order to determine at the time the user is focusing on that(those) particular spot(s) or portion(s) of the display surface what objects are being displayed to the user.

In some cases, each of the first content and the one or more second content might include, without limitation, at least one of video content, image content, text content, or scenery content, and/or the like. In some instances, each of the first content and the one or more second content might comprise teaching material associated with subjects including, but is not limited to, at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like. In some embodiments, the plurality of objects might include, without limitation, at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books, and/or the like.

In some aspects, some embodiments use augmented reality goggles that have a small camera mounted to the middle of each lens that captures eye movement of the wearer. The captured images or video of the wearer's eyes is continuously monitored to evaluate and align both pupils to determine where within the presented visual display within the goggles the student is focused. From a virtual reality or augmented reality perspective, the goggles are not just "goggles" but function both as an input device (with eye movement, head tracking, and verbal cues, etc.) and as an output device (e.g., the display of VR or AR content, etc.). Traditional AR or VR goggles will not work for AI-enabled learning because they are limited to head motion tracking, which does not have high enough granularity for identifying the topics a student may be drawn to when viewing, e.g., textual content. By tracking eye movement and correlating this movement with textual content (or video content, image content, or scenery content, etc.), an analysis engine (e.g., the computing system 105 or the like) can identify the topics that a student gravitates towards, and thereby identify the student's interests. Learning material or content can be retrieved or generated, and presented to a user, e.g., by following a "learning tree," which is essentially an ontology for AI. In a non-limiting example, a student might be looking at a level one early reader book about a boy, a girl, and a dog. The student's eyes jump to the picture of the dog. The AI solution identifies the student's interest in dogs, which is in the ontology branch for animals. The AR can present other elements along the animal branch, such as farm animals (including, but not limited to, cows, horses, etc.), to detect whether there is interest. If there is no interest, the system can present other elements within the "animal branch," such as household pets (including, without limitation, rabbits, hamsters, puppies, kittens, etc.), and can further customize the learning curriculum or learning ontology. The ontology is used for machine learning. Each student would have his or her own ontology that describes the student's interests, and the ontology would be pruned and grown using the master learning ontology. In various aspects, the system may also be able to identify proportional interests of each student. For instance, using the eye tracking techniques described herein, the system might determine that the user is interested in both Legos and pets, but is more interested in Legos at that point in the student's development or life.

The master learning ontology may be multi-dimensional that provides both age and grade attributes, as well as potential attributes describing potential careers described by the branches (for example, an early interest in animals could identify early strengths that lend themselves toward the student becoming a farmer, a veterinarian, etc.). The student's ontology would evolve throughout the student's learning path to identify potential career paths and to help build competencies to further prepare the student for a career that interests him or her. In general, the solution comprises three major components: eye-movement tracking using AR or VR goggles (or any of the display or user devices described herein), a master learning ontology, and an individual self-growing ontology that represents the student and his or her interests (both short term and long term).

With the student's self-growing ontology and with the master learning ontology being stored either in a central data store or across a distributed (or cloud) data storage system, different user devices and/or display devices may be used at different times to track and identify the student's evolving short term and long term interests. As technologies improve in the user devices and/or display devices in terms of functionality, form factor, eye tracking capabilities, and/or the like, such technologies can be directly applied to evolving both the student's self-growing ontology and the master learning ontology.

Figure 2:
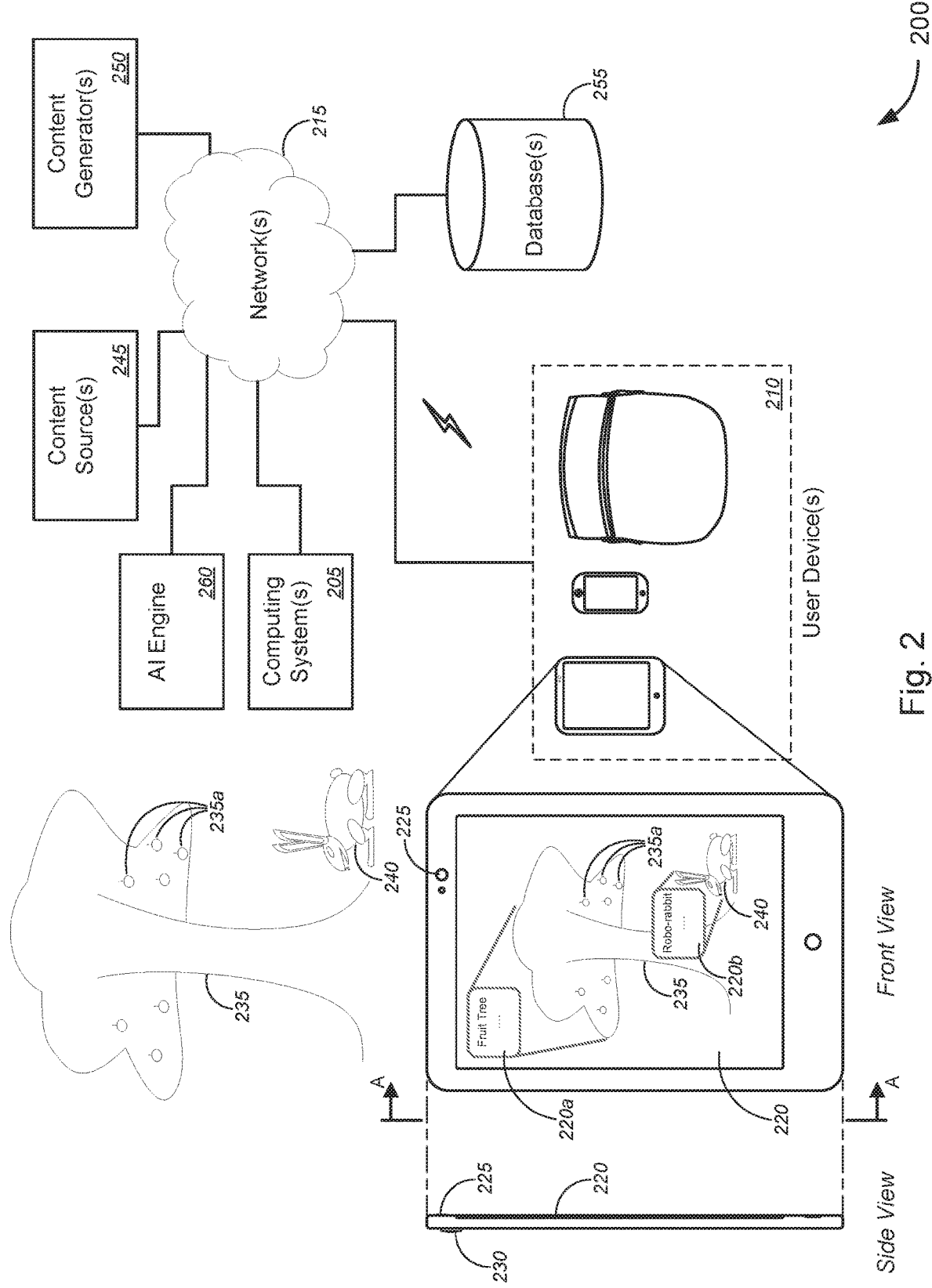
FIG. 2 is a schematic diagram illustrating another system for implementing AI-powered augmented reality learning devices, in accordance with various embodiments.

FIG. 2 is a schematic diagram illustrating another system 200 for implementing AI-powered augmented reality learning devices, in accordance with various embodiments.

In the non-limiting embodiment of FIG. 2, system 200 might comprise a computing system(s) 205 and one or more user devices 210. Although specific embodiments of user devices 210 are shown in FIG. 2 (e.g., a tablet computer, a smart phone, and a virtual reality or augmented reality headset, or the like), the various embodiments are not so limited, and each user device 210 might include, without limitation, one of a virtual reality ("VR") headset, an augmented reality ("AR") headset, a set of AR glasses, smart eyewear, a tablet computer, a smart phone adapted as part of a VR headset, or a smart phone adapted as part of an AR system, and/or the like. In some embodiments, the computing system(s) 205 might include, without limitation, a server computer, a cloud computing system, and/or the like, that is separate from, or remote from, the one or more user devices 210, and that is accessible via network(s) 215 over a wired connection (e.g., as shown in FIG. 2 by the solid line between the one or more user devices 210 and the network(s) 215) or over a wireless connection (e.g., as shown in FIG. 2 by the lightning bolt symbol between the one or more user devices 210 and the network(s) 215). In some cases, the network(s) 215 might include, but is not limited to, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

According to some embodiments, the user device 210 might further include, but is not limited to, a display surface or display screen 220, a first camera 225 (as shown in the front view of the user device 210 as being on the user-facing panel of the user device 210), a second camera 230 (as shown in the side view of user device 210 as shown along the direction of arrows A-A of the front view of the user device 210), and/or the like. Although tablet computers and smart phones currently available front facing and rear facing cameras (corresponding to the second and first cameras 230 and 225, respectively), typical other user devices (e.g., AR headsets, VR headsets, or other eyewear) either lack one or both of such cameras. The various embodiments herein are directed to such other user devices that have at least the first camera 225 disposed on a user-facing panel or surface of the user devices so as to capture images of the user's or wearer's eyes. In some cases, particularly for eyewear-based or goggle-based implementations of the user device 210, the first camera 225 might comprise eye tracking cameras or sensors, including, but not limited to Adhawk Microsystem's eye-movement sensors, or the like.

In operation, the second camera 230 of user device 210 might capture one or more images (or video) of an environment or scene in front of a user. In the non-limiting embodiment of FIG. 2, for instance, the second camera 230 might capture a scene in which a fruit tree 235 with fruits 235a might occupy a central region of the captured image (as shown in the front view of the display screen 220 of the user device 210 in FIG. 2). The scene might also include a robot or toy rabbit 240 (also referred to herein as "robo-rabbit" or the like), which might be located at the base of the tree 235 (as also shown in the front view of the display screen 220 of the user device 210 in FIG. 2). In the embodiments in which augmented reality ("AR") functionality is implemented, information overlays or AR bubbles 220a and 220b might appear in the display screen 220 to provide information about the captured images of the fruit tree 235 and the robo-rabbit 240. In some cases, the AR functionality might utilize image recognition and/or data gathering techniques to provide the user with relevant and/or useful information about captured images of objects such as the fruit tree 235 and the robo-rabbit 240.

The first camera 225 of the user device 210 might capture one or more images (or video) of the eyes of the user, and, in some cases, might utilize eye tracking techniques to track the positions (or focus directions) and movements of the user's eyes relative to the first camera 225 and/or relative to the display surface or display screen 220 while capturing the images (or video) of the user's eyes. The first camera 225 might then send, to computing system(s) 205 via network(s) 215, the captured images (or video) of the positions of the eyes of the user relative to the display surface 220 as the user is viewing the captured images (or video) of the environment being displayed on the display surface 220. The computing system 205 might receive the recorded or captured images (or video) of the positions of the eyes of the user correlated with particular portions of the captured images (or video) of the environment being displayed on the display surface 220, might analyze the received recorded or captured images (or video) of the positions of the eyes of the user to correlate with particular portions of the captured images (or video) of the environment as displayed on the display surface 220, and might identify one or more first objects of the plurality of objects that are displayed on the display surface of the display device that correspond to the positions of the eyes of the user relative to the display surface of the display device, based at least in part on the analysis of the received captured images (or video) of the positions of the eyes of the user correlated with particular portions of the captured images (or video) of the environment that are displayed on the display surface of the display device. In this example, the user might focus his or her attention (as represented by his or her eyes) on one of the fruit tree 235, the one or more fruits 235a, or the robo-rabbit 240 as images or video of the scene containing these objects being captured and displayed on the display surface 220, and thus the computing system might identify the one of the fruit tree 235, the one or more fruits 235a, or the robo-rabbit 240 as being the one or more first objects (i.e., objects of interest to the user). In some embodiments, identifying the one or more first objects might comprise at least one of identifying one or more first objects on which the eyes of the user focus or linger for at least a predetermined amount of time (e.g., a few seconds, a few minutes, or longer, etc.), identifying one or more first objects that the eyes of the user trace (e.g., tracing an outline of a portion or the entirety of the object with his or her eyes, or the like), identifying one or more first objects to which the eyes of the user sudden flick (e.g., flicking his or her eyes to the object of interest to him or her as the object comes into view within the display or as the user becomes aware that the object is in the display region of the display surface, or the like), or identifying one or more first objects to which the eyes of the user repeatedly returns (e.g., the user's eyes turn toward the robo-rabbit 240, for instance, then looks away, then returns his or her gaze to the robo-rabbit 240 and away, again and again, etc.).

The computing system 205 might send, to a content source(s) 245 via network(s) 215, a request for first content containing the identified one or more first objects (i.e., the one of the fruit tree 235, the one or more fruits 235a, or the robo-rabbit 240, or trees in general, or fruits in general, or toy animals in general, or animals in general). Such first content might include, without limitation, at least one of video content, image content, text content, or scenery content, and/or the like, that contain the identified one or more first objects or related objects. In some cases, the first content might comprise teaching material associated with subjects include, but is not limited to, at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like, that contain the identified one or more first objects or related objects.

Based on a determination that one or more second content containing the identified one or more first objects are available via the content source(s) 245, the computing system 205 might retrieve the one or more second content and might display the one or more second content on the display surface of the display device. As the one or more second content is being displayed on the display surface 220 of the display device 210, the first camera 225 might again capture images (or video) of the user's eyes, and the process might be repeated or iterated to identify objects of interest for the user, so that more content can be found related to subjects being taught to the user. In this manner, with content covering subjects that the user is supposed to learn containing objects that are of interest to the user, the user is more likely to engage with the content, and is thus more likely to learn the subjects that the user is supposed to learn.

Based on a determination that no content containing the identified one or more first objects is available via the content source(s) 245, the computing system 205 might send a request, to content generator(s) 250 or the like, to generate content containing the identified one or more first objects; might retrieve, from the content generator(s) 250 or the like, the generated content containing the identified one or more first objects; and might display, on the display surface 220 of the display device 210, the retrieved generated content. As described above, the user's eyes may be tracked to further identify objects of interest to the user as the generated content is being displayed to the user.

The system 200 might further comprise database(s) 255, which may be used to store information regarding objects that are identified as being of interest to the user (either short term or long term), so that such information may be used in the future to develop content tailored to the interests of the user, for education, entertainment, and/or other reasons. The user (or parents of the user, if the user is a minor) may be provided with options to set privacy settings regarding information about the user and about his or her interests, and regarding who has access to such information and to what degree (e.g., limiting access to anonymous information that actively dissociates the information from identifying data about the user, or the like).

According to some embodiments, the system 200 might further comprise an artificial intelligence ("AI") engine 260 that may be used to aid the computing system 205 in identifying objects of interest to the user, from assisting or facilitating eye position/movement tracking, to correlating (or mapping) eye position/movement tracking with (to) display surface position, to correlating (or mapping) display surface position with content being displayed on the display surface at particular times (which may include implementing synchronization techniques or other timing techniques, or the like), to identifying objects based on the correlations (or mappings), to tracking and evolving one or both of the user's self-growing ontology and/or the master learning ontology, and so on.

The computing system(s) 205, the one or more user devices 210, and the content source(s) 245 of system 200 in FIG. 2 are otherwise similar, if not identical, to the computing system 105a or 105b, the one or more user devices 120, and the content source(s) 140 (and corresponding database(s) 145), respectively, of system 100 in FIG. 1, and the descriptions of these components of system 100 are applicable to the corresponding components of system 200, respectively.

Figure 3:
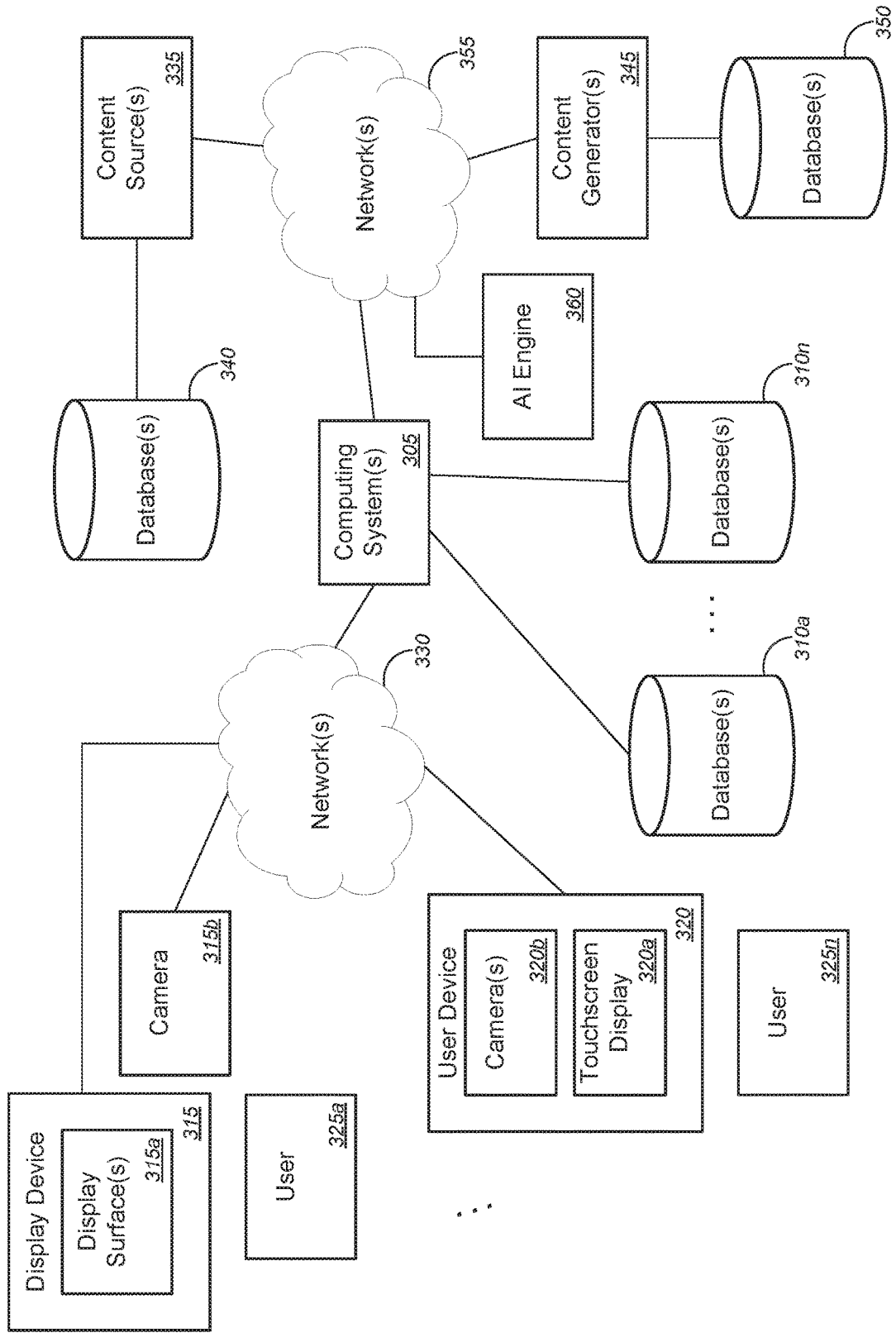
FIG. 3 is a schematic diagram illustrating yet another system for implementing AI-powered augmented reality learning devices, in accordance with various embodiments.

FIG. 3 is a schematic diagram illustrating yet another system 300 for implementing AI-powered augmented reality learning devices, in accordance with various embodiments.

In the non-limiting embodiment of FIG. 3, system 300 might comprise computing system(s) 305, one or more databases 310a-310n (collectively, "databases 310" or the like), one or more display devices 315 (collectively, "display devices 315" or the like), and one or more user devices 320 (collectively, "user devices 320" or the like). In some cases, each display device 315 might include a display surface(s) 315a and, in some cases, might also include one or more image capture devices (either built-in as shown in FIG. 1 or external as depicted by camera 315b or camera 125 of FIG. 1, or the like). Likewise, each user device 320 might include a display surface 320a (which may be a touchscreen display or touchscreen display device, or may be a non-touch display screen, or the like) and, in some cases, might also include one or more image capture devices (either built-in such as camera(s) 320b or external camera(s) 125 of FIG. 1 or camera 315b, or the like). Here, multiple users 325a-325n (collectively, "users 325," "students 325," or the like), which might include students in a class or the like, might each view images or video being displayed on the display surface(s) of either a display device (e.g., display device 315) or a user device (e.g., user device 320), or the like, while cameras 315b or 320b capture images (or video) of the positions (or focus directions) of the user's eyes.

System 300 might further comprise network(s) 330, content source(s) 335 (and corresponding database(s) 340), content generator(s) 345 (and corresponding database(s) 350), network(s) 355, and AI engine 360. The computing system(s) 305 might receive, via network(s) 330, the recorded or captured images (or video) of the positions of the eyes of each user 325 of the plurality of users 325a-325n correlated with particular portions of the captured images (or video) of the environment being displayed on the display surface 315a or 320a being viewed by each user 325, might analyze the received recorded or captured images (or video) of the positions of the eyes of each user 325 to correlate with particular portions of the captured images (or video) of the environment as displayed on the display surface 315a or 320a being viewed by each user 325, and might identify— for each user 325—one or more second objects of the plurality of objects that are displayed on the display surface of the display device or user device that correspond to the positions of the eyes of each user 325 relative to the display surface of the display device or user device, based at least in part on the analysis of the received captured images (or video) of the positions of the eyes of each user 325 correlated with particular portions of the captured images (or video) of the environment that are displayed on the display surface of the display device or user device. The computing system(s) 305 might further determine whether there are common objects among the identified one or more second objects. Based on a determination that there are common objects among the identified one or more second objects, the computing system(s) 305 might identify one or more third objects among the one or more second objects that are common among each of one or more sets of users among the plurality of users 325. For instance, some users in a classroom might be interested in animals, while other users might be interested in plants, while yet other users might be interested in insects, or still other users might be interested in vehicles, and so on.

The computing system 305 might send, to a content source(s) 335 via network(s) 355, a request for third content containing the identified one or more third objects or related objects. Such third content might include, without limitation, at least one of video content, image content, text content, or scenery content, and/or the like, that contain the identified one or more third objects or related objects. In some cases, the third content might comprise teaching material associated with subjects include, but is not limited to, at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like, that contain the identified one or more third objects or related objects.

Based on a determination that one or more fourth content containing the identified one or more third objects are available via the content source(s) 335, the computing system 305 might retrieve the one or more fourth content and might display the one or more fourth content on the display surface of the display device or user device for each of the users in the identified set of users 325. As the one or more fourth content is being displayed on the display surface of the display device, the camera 315b or 320b might again capture images (or video) of each user's eyes, and the process might be repeated or iterated to identify objects of interest for each user, so that more content can be found related to subjects being taught to each user. In this manner, with content covering subjects that each user is supposed to learn containing objects that are of interest to each user, the users are more likely to engage with the content, and are thus more likely to learn the subjects that the users are supposed to learn.

Based on a determination that no content containing the identified one or more third objects is available via the content source(s) 335, the computing system 305 might send a request, to content generator(s) 345 or the like, to generate content containing the identified one or more third objects; might retrieve, from the content generator(s) 345 or the like, the generated content containing the identified one or more third objects; and might display, on the display surface 220 of the display device 210, the retrieved generated content. As described above, the user's eyes may be tracked to further identify objects of interest to each user as the generated content is being displayed to each user. In some cases, content that is generated by content generator(s) 345 may be stored in either database(s) 340 (for future access and search via content source(s) 355 or the like) or database(s) 350.

The databases 310 may be used to store information regarding objects that are identified as being of interest to each user 325 (either short term or long term), so that such information may be used in the future to develop content tailored to the interests of the user, for education, entertainment, and/or other reasons. The user (or parents of the user, if the user is a minor) may be provided with options to set privacy settings regarding information about the user and about his or her interests, and regarding who has access to such information and to what degree (e.g., limiting access to anonymous information that actively dissociates the information from identifying data about the user, or the like). In some embodiments, the databases 310, 340, and/or 350 may be used to store information regarding objects that are of common interest to two or more users 325 (e.g., groups of students in a class, users in a demographic group, or the like).

According to some embodiments, AI engine 360 that may be used to aid the computing system 305 in identifying objects of interest to each user or of common interest to one or more groups of users, from assisting or facilitating eye position/movement tracking, to correlating (or mapping) eye position/movement tracking with (to) display surface position, to correlating (or mapping) display surface position with content being displayed on the display surface at particular times (which may include implementing synchronization techniques or other timing techniques, or the like), to identifying objects based on the correlations (or mappings), to identifying common objects of interest to more than one user, to tracking and evolving one or both of each user's self-growing ontology and/or the master learning ontology, and so on. In some cases, the AI engine 360 might be embodied by a portable compute device, including, but not limited to, an Intel® Movidius® Neural Compute Stick, or the like.

The computing system(s) 305, the one or more display devices 315, the one or more user devices 320, the external camera 315b, and the content source(s) 345 of system 300 in FIG. 3 are otherwise similar, if not identical, to the computing system 105a or 105b, the one or more display devices 115, the one or more user devices 120, the external camera 125, and the content source(s) 140 (and corresponding database(s) 145), respectively, of system 100 in FIG. 1, and the descriptions of these components of system 100 are applicable to the corresponding components of system 300, respectively. The databases 310a-310n, the content source(s) 335 (and corresponding database(s) 340), the content generator(s) 345 (and corresponding database(s) 350), and the AI engine 360 of system 300 of FIG. 3 are otherwise similar, if not identical, to database(s) 255, the content source(s) 245, the content generator(s) 250, and the AI engine 260 of system 200 of FIG. 2, and the descriptions of these components of system 200 are applicable to the corresponding components of system 300, respectively.

FIGS. 4A-4D (collectively, "FIG. 4") are flow diagrams illustrating a method 400 for implementing AI-powered augmented reality learning devices, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4A, method 400, at block 402, might comprise displaying, on a display surface of a display device, a first content to a user, the displayed first content comprising a plurality of objects. In some cases, the display device might include, but is not limited to, one of augmented reality ("AR") goggles or eyewear, virtual reality ("VR") goggles or eyewear, smart eyewear, a tablet computer, a smart phone, a television, or a monitor, and/or the like. According to some embodiments, the plurality of objects might include, without limitation, at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books, and/or the like.

At block 404, method 400 might comprise capturing, with at least one image capture device, images of positions of eyes of the user relative to the display surface of the display device as the first content is being displayed. In some instances, the at least one image capture device might be disposed in one of augmented reality ("AR") goggles facing eyes of a wearer, virtual reality ("VR") goggles facing eyes of a wearer, a wearer-facing surface of smart eyewear, a user-facing panel of a tablet computer, a user-facing panel of a smart phone, an external component mounted on a television to face a room, or a user-facing panel of a monitor, and/or the like.

Method 400 might further comprise receiving, with a computing system, the captured images of the positions of the eyes of the user correlated with particular portions of the first content that are displayed on the display surface of the display device (block 406). In some embodiments, the computing system might include, but is not limited to, one of a set-top box ("STB"), a digital video recording ("DVR") device, a processor of the display device running a software application ("app"), a processor of a user device running an app, a server computer over a network, a cloud-based computing system over a network, a media player, or a gaming console, and/or the like. Method 400 might further comprise, at block 408, identifying, with the computing system, one or more first objects of the plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device. At block 410, method 400 might comprise sending, with the computing system and to a content source, a request for additional content containing the identified one or more first objects.

Method 400 might, at block 412, comprise determining, with the computing system, whether any existing content contains the identified one or more first objects. If so, method 400 continues to the process of block 414. Method 400 might comprise, based on a determination that one or more second content containing the identified one or more first objects are available via the content source, retrieving, with the computing system, the one or more second content (block 414) and displaying, with the computing system, the one or more second content on the display surface of the display device (block 416). If not, method 400 continues to the process of block 418. Method 400 might comprise, based on a determination that no content containing the identified one or more first objects is available via the content source, sending, with the computing system, a request (for example, to a content generator(s) or the like) to generate content containing the identified one or more first objects (block 418). In some embodiments, although not shown in FIG. 4, method 400 might further comprise retrieving, with the computing system (and from the content generator(s), or the like), one or more generated content containing the identified one or more first objects and displaying, with the computing system, the one or more generated content on the display surface of the display device.

According to some embodiments, each of the first content and the one or more second content might comprise at least one of video content, image content, text content, or scenery content, and/or the like. In some cases, each of the first content and the one or more second content might comprise teaching material associated with subjects including, without limitation, at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like.

Figure 4B:
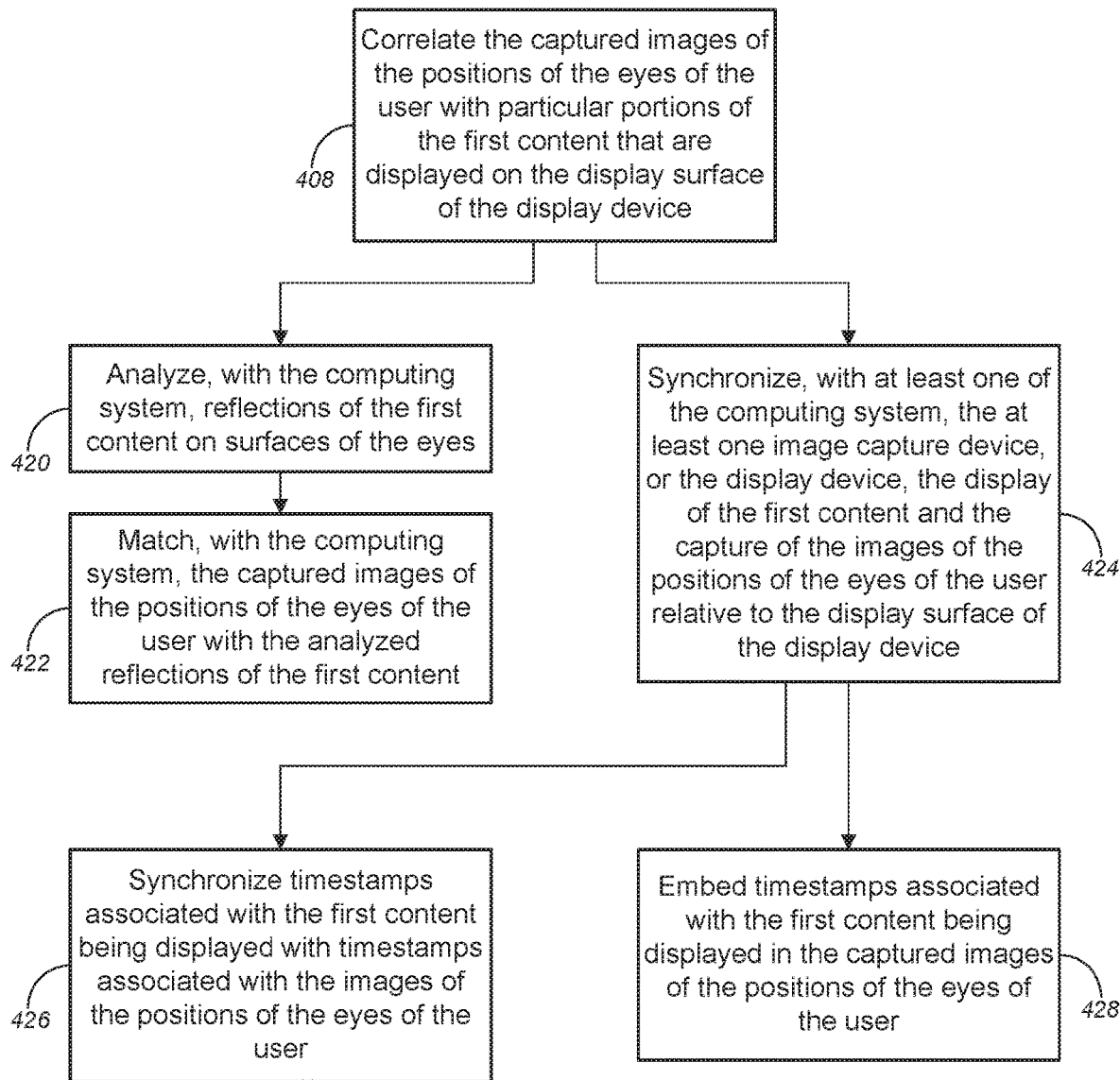

With reference to FIG. 4B, correlating the captured images of the positions of the eyes of the user with particular portions of the first content that are displayed on the display surface of the display device (as part of the process of block 408 or the like) might comprise analyzing, with the computing system, reflections of the first content on surfaces of the eyes (block 420), and matching, with the computing system, the captured images of the positions of the eyes of the user with the analyzed reflections of the first content (block 422). Alternatively, or additionally, correlating the captured images of the positions of the eyes of the user with particular portions of the first content that are displayed on the display surface of the display device (as part of the process of block 408 or the like) might comprise synchronizing, with at least one of the computing system, the at least one image capture device, or the display device, the display of the first content and the capture of the images of the positions of the eyes of the user relative to the display surface of the display device (block 424). In some embodiments, synchronizing the display of the first content and the capture of the images of the positions of the eyes of the user relative to the display surface of the display device (at block 424) might comprise either synchronizing timestamps associated with the first content being displayed with timestamps associated with the images of the positions of the eyes of the user (block 426) or embedding timestamps associated with the first content being displayed in the captured images of the positions of the eyes of the user (block 428).

Figure 4C:
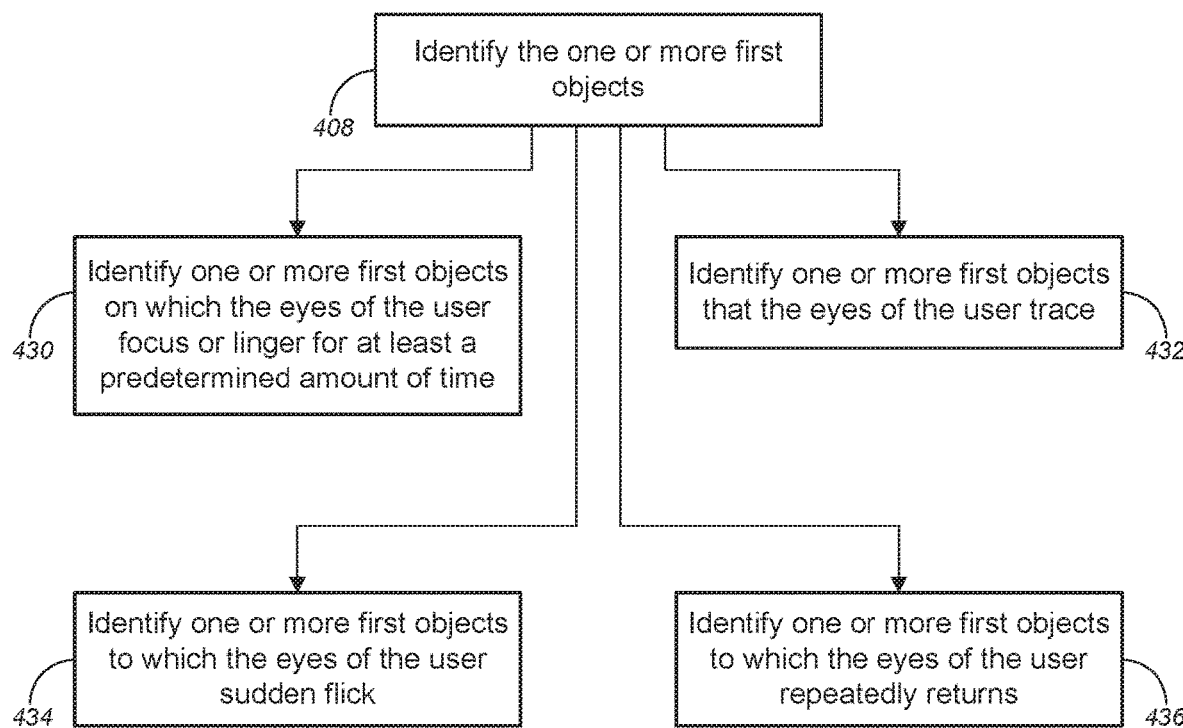

Referring to FIG. 4C, identifying the one or more first objects (at block 408 or the like) might comprise at least one of identifying one or more first objects on which the eyes of the user focus or linger for at least a predetermined amount of time (block 430), identifying one or more first objects that the eyes of the user trace (block 432), identifying one or more first objects to which the eyes of the user sudden flick (block 434), or identifying one or more first objects to which the eyes of the user repeatedly returns (block 436).

Figure 4D:
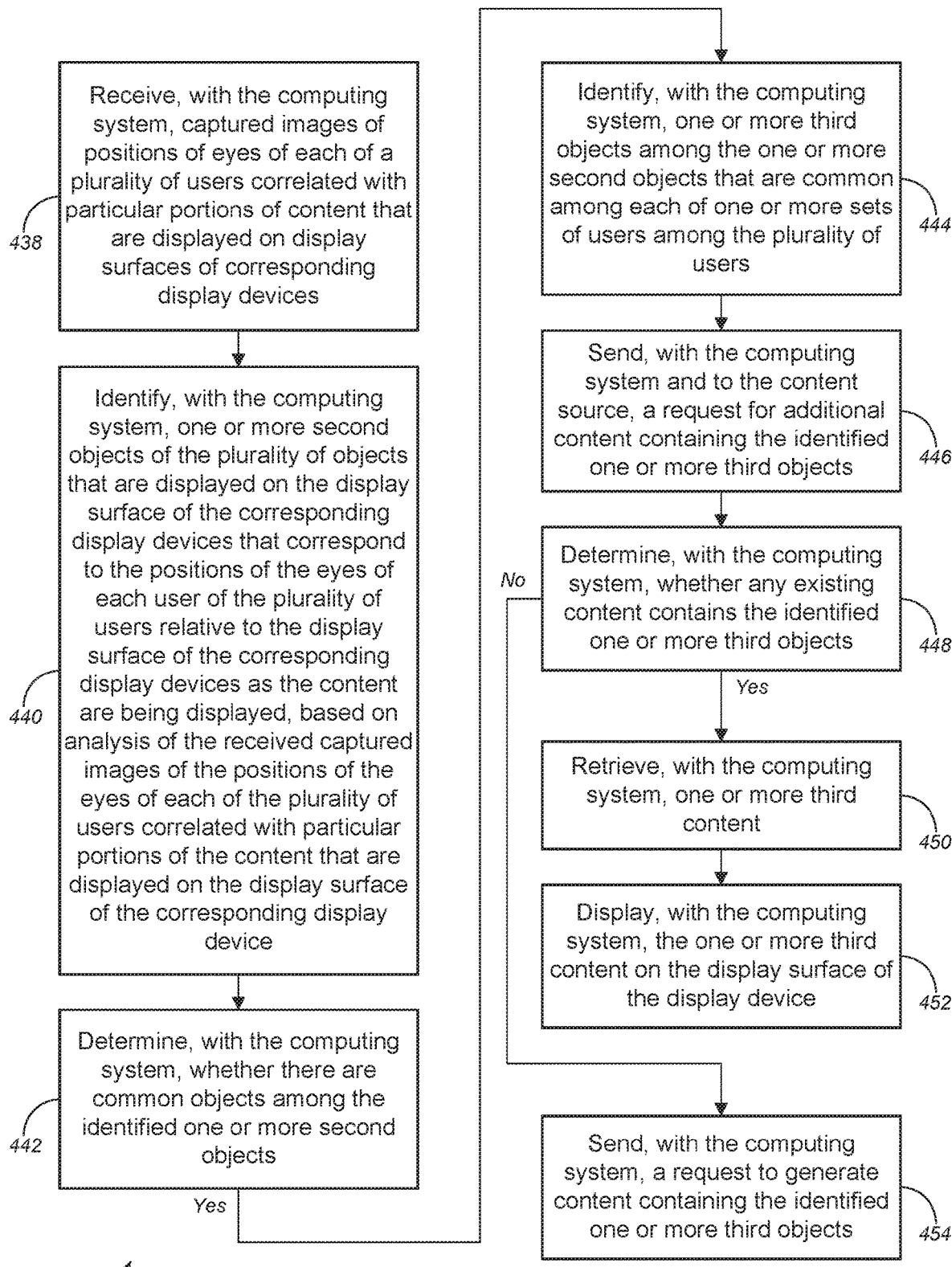

Turning to FIG. 4D, method 400 might further comprise receiving, with the computing system, captured images of positions of eyes of each of a plurality of users correlated with particular portions of content that are displayed on display surfaces of corresponding display devices (block 438). At block 440, method 400 might comprise identifying, with the computing system, one or more second objects of the plurality of objects that are displayed on the display surface of the corresponding display devices that correspond to the positions of the eyes of each user of the plurality of users relative to the display surface of the corresponding display devices as the content are being displayed, based at least in part on analysis of the received captured images of the positions of the eyes of each of the plurality of users correlated with particular portions of the content that are displayed on the display surface of the corresponding display device. Method 400 might further comprise, at block 442, determining, with the computing system, whether there are common objects among the identified one or more second objects. If so, method 400 continues to the process of block 444.

At block 444, method 400 might comprise identifying, with the computing system, one or more third objects among the one or more second objects that are common among each of one or more sets of users among the plurality of users. Method 400 might further comprise, at block 446, sending, with the computing system and to the content source, a request for additional content containing the identified one or more third objects.

Method 400 might, at block 448, comprise determining, with the computing system, whether any existing content contains the identified one or more third objects. If so, method 400 continues to the process of block 450. Method 400 might comprise, based on a determination that one or more third content containing the identified one or more third objects are available via the content source, retrieving, with the computing system, the one or more third content (block 450) and displaying, with the computing system, the one or more third content on the display surface of the display device (block 452). If not, method 400 continues to the process of block 454. Method 400 might comprise, based on a determination that no content containing the identified one or more third objects is available via the content source, sending, with the computing system, a request (for example, to a content generator(s) or the like) to generate content containing the identified one or more third objects (block 454). In some embodiments, although not shown in FIG. 4, method 400 might further comprise retrieving, with the computing system (and from the content generator(s), or the like), one or more generated content containing the identified one or more third objects and displaying, with the computing system, the one or more generated content (containing the identified one or more third objects) on the display surface of the display device.

Exemplary System and Hardware Implementation

Figure 5:
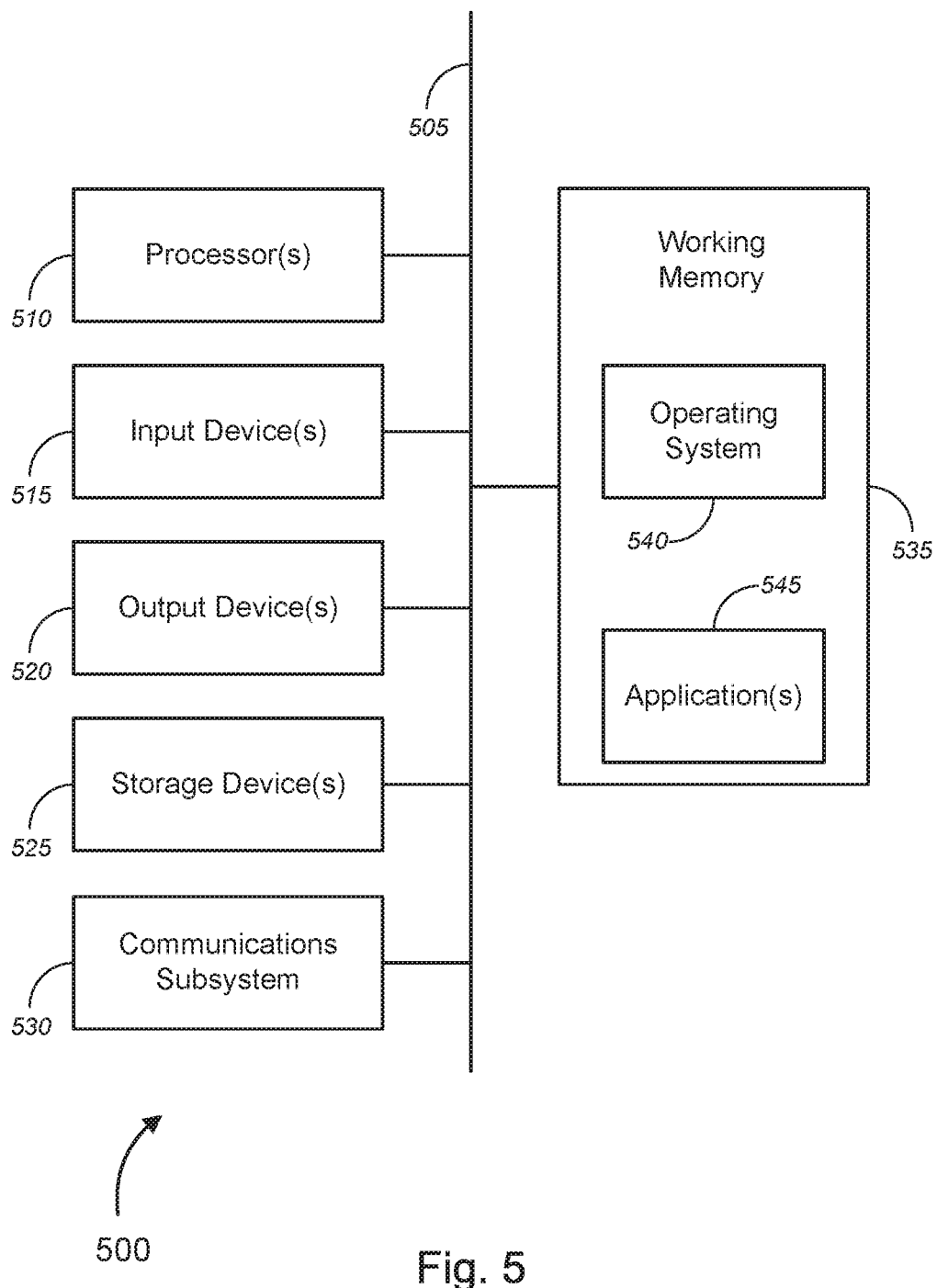
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a, 105b, 205, and 305, display devices 115 and 315, user devices 120, 210, and 320, audio playback devices 130a-130n, content sources (or servers) 140, 245, and 335, content generators (or servers) 250 and 345, and artificial intelligence ("AI") engine 260 and 360, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a, 105b, 205, and 305, display devices 115 and 315, user devices 120, 210, and 320, audio playback devices 130a-130n, content sources (or servers) 140, 245, and 335, content generators (or servers) 250 and 345, and AI engine 260 and 360, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH- EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
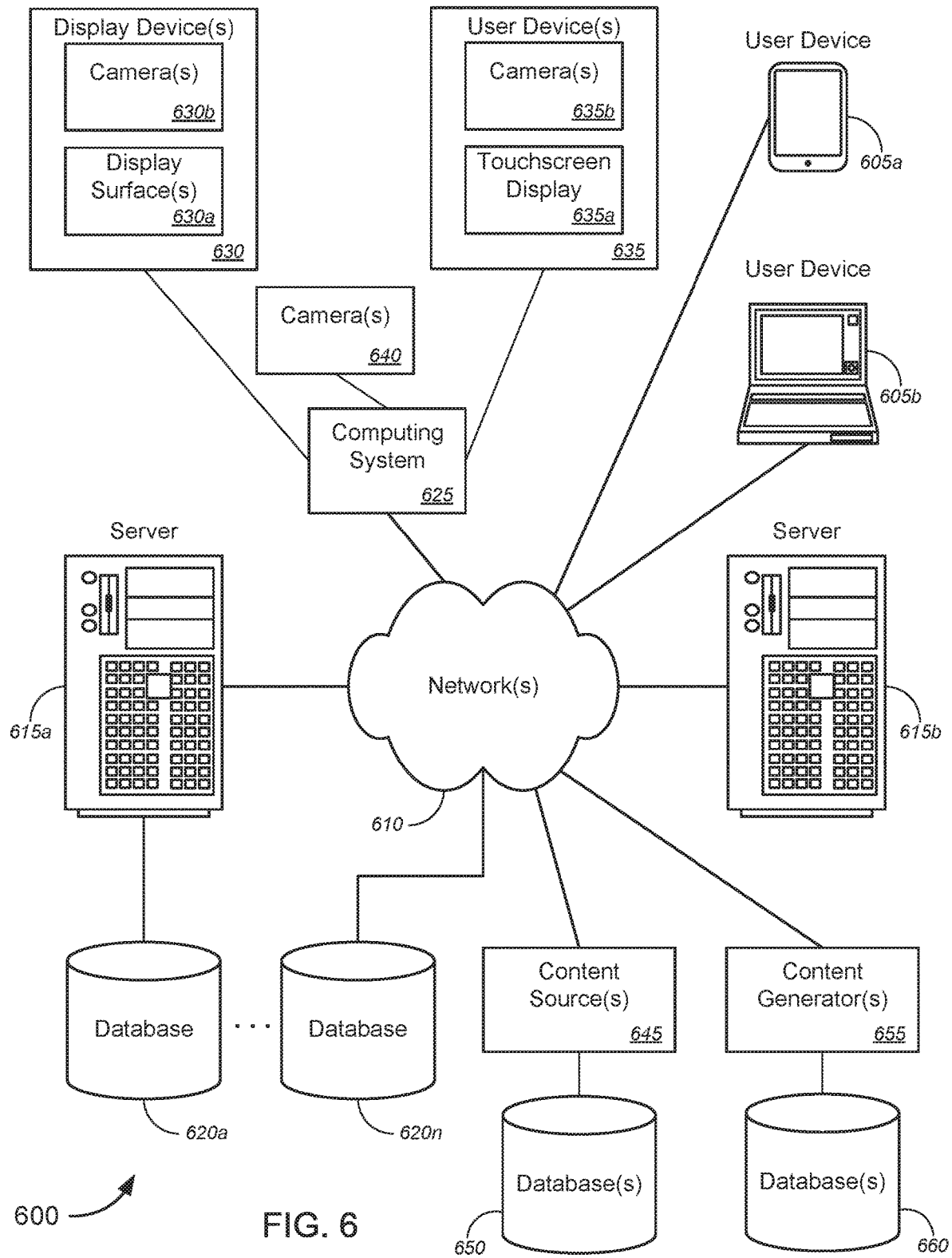
FIG. 6 is a block diagram illustrating a networked system of computers, computing systems, or system hardware architecture, which can be used in accordance with various embodiments.

As noted above, a set of embodiments comprises methods and systems for implementing learning technologies, and, more particularly, to methods, systems, and apparatuses for implementing artificial intelligence ("AI")-powered augmented reality learning devices. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 150, 215, 330, and 355 of FIGS. 1-3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing learning technologies, and, more particularly, to methods, systems, and apparatuses for implementing artificial intelligence ("AI")-powered augmented reality learning devices, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105a, 105b, 205, and 305 of FIGS. 1-3, or the like), one or more display devices 630 each with display surface(s) 630a and camera(s) 630b (similar to display devices 115 and 315 of FIGS. 1 and 3, or the like), one or more user devices 635 each with touchscreen display 635a and camera(s) 635b (similar to user devices 120, 210, and 320 of FIGS. 1-3, or the like), one or more cameras 640, one or more content sources 645 and corresponding database(s) 650 (similar to content sources (or servers) 140, 245, and 335 and corresponding databases 145 and 340 of FIGS. 1-3, or the like), one or more content generators 655 and corresponding database(s) 660 (similar to content generators (or servers) 250 and 345 and corresponding databases 350 of FIGS. 2 and 3, or the like), and/or the like. In some embodiments, the computing system 625 might include, without limitation, one of a set-top box ("STB"), a digital video recording ("DVR") device, a processor of the display device running a software application ("app"), a processor of a user device running an app, a server computer over a network, a cloud-based computing system over a network, a media player, or a gaming console, and/or the like. In some cases, the display device(s) 630 might include, but is not limited to, one of augmented reality ("AR") goggles or eyewear, virtual reality ("VR") goggles or eyewear, smart eyewear, a tablet computer, a smart phone, a television, or a monitor, and/or the like. In some instances, the camera(s) 630b, 635b, and 640 might be disposed in one of augmented reality ("AR") goggles facing eyes of a wearer, virtual reality ("VR") goggles facing eyes of a wearer, a wearer-facing surface of smart eyewear, a user-facing panel of a tablet computer, a user-facing panel of a smart phone, an external component mounted on a television to face a room, or a user-facing panel of a monitor, and/or the like. According to some embodiments, In operation, the display device(s) 630 and/or the user device(s) 605 or 635 might display, on a display surface thereof (e.g., display surface(s) 630a or touchscreen display 635a), a first content to a user, the displayed first content comprising a plurality of objects. The camera(s) 630b, 635b, and/or 640 might capture images of positions of eyes of the user relative to the display surface(s) of the display device(s) 630 as the first content is being displayed. The computing system 625 (or server 615a or 615b, or user devices 605 or 635, or the like) might receive the captured images of the positions of the eyes of the user correlated with particular portions of the first content that are displayed on the display surface(s) 630a or 635a of the display device(s) 630 (or user devices 605 or 635). The computing system 625 (or server 615a or 615b, or user devices 605 or 635, or the like) might identify one or more first objects of the plurality of objects that are displayed on the display surface(s) 630a or 635a of the display device(s) 630 (or user devices 605 or 635) that correspond to the positions of the eyes of the user relative to the display surface(s) 630a or 635a of the display device(s) 630 (or user devices 605 or 635) as the first content is being displayed, based at least in part on analysis of the received captured images of the positions of the eyes of the user correlated with particular portions of the first content that is displayed on the display surface(s) 630a or 635a of the display device(s) 630 (or user devices 605 or 635). The computing system 625 (or server 615a or 615b, or user devices 605 or 635, or the like) might send a request to a content source(s) 645 for additional content containing the identified one or more first objects. Based on a determination that one or more second content containing the identified one or more first objects are available via the content source(s) 645 and/or database(s) 650, the computing system 625 (or server 615a or 615b, or user devices 605 or 635, or the like) might retrieve the one or more second content from the database(s) 650 via the content source(s) 645, and might display the one or more second content on the display surface(s) 630a or 635a of the display device(s) 630 (or user devices 605 or 635). Based on a determination that no content containing the identified one or more first objects is available via the content source(s) 645 and/or database(s) 650, the computing system 625 (or server 615a or 615b, or user devices 605 or 635, or the like) might send a request to the content generator(s) 655 to generate content containing the identified one or more first objects, might retrieve the generated content from the database(s) 660 via the content generator(s) 655, and might display the generated content on the display surface(s) 630a or 635a of the display device(s) 630 (or user devices 605 or 635).

In some cases, each of the first content and the one or more second content might include, without limitation, at least one of video content, image content, text content, or scenery content, and/or the like. In some instances, each of the first content and the one or more second content might comprise teaching material associated with subjects including, but is not limited to, at least one of mathematics, language, biology, chemistry, physics, science, history, social studies, economics, writing, computer science, geography, art, design, music, reading, ethics, drama, psychology, philosophy, accounting, health, technology, media studies, or home economics, and/or the like. In some embodiments, the plurality of objects might include, without limitation, at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    displaying, on a display surface of a display device, a first content to a user, the displayed first content comprising a plurality of objects;
    capturing, with at least one image capture device, images of positions of eyes of the user relative to the display surface of the display device as the first content is being displayed;
    receiving, with a computing system, the captured images of the positions of the eyes of the user correlated with particular portions of the first content that are displayed on the display surface of the display device;
    identifying, with the computing system, one or more first objects of the plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device;
    sending, with the computing system and to a content source, a request for additional content containing the identified one or more first objects;
    based on a determination that one or more second content containing the identified one or more first objects are available via the content source, retrieving, with the computing system, the one or more second content and displaying, with the computing system, the one or more second content on the display surface of the display device;
    based on a determination that no content containing the identified one or more first objects is available via the content source, sending, with the computing system, a request to generate content containing the identified one or more first objects;
    receiving, with the computing system, captured images of positions of eyes of each of a plurality of users correlated with particular portions of content that are displayed on display surfaces of corresponding display devices;
    identifying, with the computing system, one or more second objects of the plurality of objects that are displayed on the display surface of the corresponding display devices that correspond to the positions of the eyes of each user of the plurality of users relative to the display surface of the corresponding display devices as the content are being displayed, based at least in part on analysis of the received captured images of the positions of the eyes of each of the plurality of users correlated with particular portions of the content that are displayed on the display surface of the corresponding display device;
    determining, with the computing system, whether there are common objects among the identified one or more second objects;
    based on a determination that there are common objects among the identified one or more second objects, identifying, with the computing system, one or more third objects among the one or more second objects that are common among each of one or more sets of users among the plurality of users;
    sending, with the computing system and to the content source, a request for additional content containing the identified one or more third objects; and
    based on a determination that one or more third content containing the identified one or more third objects are available via the content source, retrieving, with the computing system, the one or more third content and displaying, with the computing system, the one or more third content on the display surface of each of the corresponding display devices.

2. The method of claim 1, wherein each of the first content and the one or more second content comprises at least one of video content, image content, text content, or scenery content.

3. The method of claim 1, wherein each of the first content and the one or more second content comprises teaching material associated with subjects comprising at least one of mathematics, language, biology, chemistry, physics, science, history, social studies, economics, writing, computer science, geography, art, design, music, reading, ethics, drama, psychology, philosophy, accounting, health, technology, media studies, or home economics.

4. The method of claim 1, wherein the plurality of objects comprises at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books.

5. The method of claim 1, wherein the display device comprises one of augmented reality ("AR") goggles, virtual reality ("VR") goggles, smart eyewear, a tablet computer, a smart phone, a television, or a monitor.

6. The method of claim 1, wherein the at least one image capture device is disposed in one of augmented reality ("AR") goggles facing eyes of a wearer, virtual reality ("VR") goggles facing eyes of a wearer, a wearer-facing surface of smart eyewear, a user-facing panel of a tablet computer, a user-facing panel of a smart phone, an external component mounted on a television to face a room, or a user-facing panel of a monitor.

7. The method of claim 1, wherein the computing system comprises one of a set-top box ("STB"), a digital video recording ("DVR") device, a processor of the display device running a software application ("app"), a processor of a user device running an app, a server computer over a network, a cloud-based computing system over a network, a media player, or a gaming console.

8. The method of claim 1, wherein correlating the captured images of the positions of the eyes of the user with particular portions of the first content that are displayed on the display surface of the display device comprises analyzing, with the computing system, reflections of the first content on surfaces of the eyes, and matching, with the computing system, the captured images of the positions of the eyes of the user with the analyzed reflections of the first content.

9. The method of claim 1, wherein correlating the captured images of the positions of the eyes of the user with particular portions of the first content that are displayed on the display surface of the display device comprises synchronizing, with at least one of the computing system, the at least one image capture device, or the display device, the display of the first content and the capture of the images of the positions of the eyes of the user relative to the display surface of the display device.

10. The method of claim 9, wherein synchronizing the display of the first content and the capture of the images of the positions of the eyes of the user relative to the display surface of the display device comprises one of synchronizing timestamps associated with the first content being displayed with timestamps associated with the images of the positions of the eyes of the user, or embedding timestamps associated with the first content being displayed in the captured images of the positions of the eyes of the user.

11. The method of claim 1, wherein identifying the one or more first objects comprises at least one of identifying one or more first objects on which the eyes of the user focus or linger for at least a predetermined amount of time, identifying one or more first objects that the eyes of the user trace, identifying one or more first objects to which the eyes of the user sudden flick, or identifying one or more first objects to which the eyes of the user repeatedly returns.

12. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive captured images of positions of eyes of a user correlated with particular portions of first content that are displayed on display surface of a display device;
identify one or more first objects of a plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device;
send, to a content source, a request for additional content containing the identified one or more first objects;
based on a determination that one or more second content containing the identified one or more first objects are available via the content source, retrieve the one or more second content and display the one or more second content on the display surface of the display device;
based on a determination that no content containing the identified one or more first objects is available via the content source, sending, with the computing system, a request to generate content containing the identified one or more first objects;
receive captured images of positions of eyes of each of a plurality of users correlated with particular portions of content that are displayed on display surfaces of corresponding display devices;
identify one or more second objects of the plurality of objects that are displayed on the display surface of the corresponding display devices that correspond to the positions of the eyes of each user of the plurality of users relative to the display surface of the corresponding display devices as the content are being displayed, based at least in part on analysis of the received captured images of the positions of the eyes of each of the plurality of users correlated with particular portions of the content that are displayed on the display surface of the corresponding display device;
determine whether there are common objects among the identified one or more second objects;
based on a determination that there are common objects among the identified one or more second objects, identify one or more third objects among the one or more second objects that are common among each of one or more sets of users among the plurality of users;
send, to the content source, a request for additional content containing the identified one or more third objects; and
based on a determination that one or more third content containing the identified one or more third objects are available via the content source, retrieve the one or more third content and displaying, with the computing system, the one or more third content on the display surface of each of the corresponding display devices.

13. The apparatus of claim 12, wherein each of the first content and the one or more second content comprises at least one of video content, image content, text content, or scenery content.

14. The apparatus of claim 12, wherein each of the first content and the one or more second content comprises teaching material associated with subjects comprising at least one of mathematics, language, biology, chemistry, physics, science, history, social studies, economics, writing, computer science, geography, art, design, music, reading, ethics, drama, psychology, philosophy, accounting, health, technology, media studies, or home economics.

15. The apparatus of claim 12, wherein the plurality of objects comprises at least one of one or more persons, one or more animals, one or more trees, one or more plants, one or more insects, one or more consumer electronics, one or more appliances, one or more furniture pieces, one or more tools, one or more items, one or more vehicles, one or more buildings, one or more landscapes, one or more scenes, or one or more books.

16. The apparatus of claim 12, wherein the display device comprises one of augmented reality ("AR") goggles, virtual reality ("VR") goggles, smart eyewear, a tablet computer, a smart phone, a television, or a monitor.

17. The apparatus of claim 12, wherein the at least one image capture device is disposed in one of augmented reality ("AR") goggles facing eyes of a wearer, virtual reality ("VR") goggles facing eyes of a wearer, a wearer-facing surface of smart eyewear, a user-facing panel of a tablet computer, a user-facing panel of a smart phone, an external component mounted on a television to face a room, or a user-facing panel of a monitor.

18. A system, comprising:
a display device, comprising:
a display surface;
at least one first processor; and
a first non-transitory computer readable medium communicatively coupled to the at least one first processor, the first non-transitory computer readable medium having stored thereon computer software comprising a first set of instructions that, when executed by the at least one first processor, causes the display device to:
receive a first content; and
display the first content to a user, the displayed first content comprising a plurality of objects;
at least one image capture device, the at least one image capture device capturing images of positions of eyes of the user relative to the display surface of the display device as the first content is being displayed; and
a computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the computing system to:
receive the captured images of the positions of the eyes of the user correlated with particular portions of the first content that are displayed on the display surface of the display device;
identify one or more first objects of the plurality of objects that are displayed on the display surface of the display device that correspond to the positions of the eyes of the user relative to the display surface of the display device as the first content is being displayed, based at least in part on analysis of the received captured images of the positions of the eyes of the user correlated with particular portions of the first content that is displayed on the display surface of the display device;
send, to a content source, a request for additional content containing the identified one or more first objects;
based on a determination that one or more second content containing the identified one or more first objects are available via the content source, retrieve the one or more second content and display the one or more second content on the display surface of the display device; based on a determination that no content containing the identified one or more first objects is available via the content source, sending, with the computing system, a request to generate content containing the identified one or more first objects;
receive captured images of positions of eyes of each of a plurality of users correlated with particular portions of content that are displayed on display surfaces of corresponding display devices;
identify one or more second objects of the plurality of objects that are displayed on the display surface of the corresponding display devices that correspond to the positions of the eyes of each user of the plurality of users relative to the display surface of the corresponding display devices as the content are being displayed, based at least in part on analysis of the received captured images of the positions of the eyes of each of the plurality of users correlated with particular portions of the content that are displayed on the display surface of the corresponding display device;
determine whether there are common objects among the identified one or more second objects;
based on a determination that there are common objects among the identified one or more second objects, identify one or more third objects among the one or more second objects that are common among each of one or more sets of users among the plurality of users;
send, to the content source, a request for additional content containing the identified one or more third objects; and
based on a determination that one or more third content containing the identified one or more third objects are available via the content source, retrieve the one or more third content and displaying, with the computing system, the one or more third content on the display surface of each of the corresponding display devices.

* * * * *